United States Patent
Micaelian (10) Patent No.: US 10,296,625 B2
(45) Date of Patent: May 21, 2019

(54) COMPUTERIZED SYSTEM AND METHOD FOR IDENTIFYING RELATIONSHIPS

(71) Applicant: Fadi Victor Micaelian, Menlo Park, CA (US)

(72) Inventor: Fadi Victor Micaelian, Menlo Park, CA (US)

( * ) Notice: Subject to any disclaimer, the term of this patent is extended or adjusted under 35 U.S.C. 154(b) by 261 days.

(21) Appl. No.: 13/844,803

(22) Filed: Mar. 16, 2013

(65) Prior Publication Data
US 2014/0280151 A1    Sep. 18, 2014

(51) Int. Cl.
*G06F 17/30*    (2006.01)

(52) U.S. Cl.
CPC .. *G06F 17/30539* (2013.01); *G06F 17/30604* (2013.01)

(58) Field of Classification Search
CPC ......... G06F 17/30598; G06F 17/30705; G06F 17/30539; G06F 17/30604
See application file for complete search history.

(56) References Cited

U.S. PATENT DOCUMENTS

| | | | | |
|---|---|---|---|---|
| 6,629,097 | B1 * | 9/2003 | Keith | G06F 17/30598 707/999.002 |
| 7,007,018 | B1 * | 2/2006 | Kirkwood | G06Q 10/10 707/694 |
| 8,260,824 | B2 * | 9/2012 | Mao | G06F 17/30604 707/756 |
| 8,595,146 | B1 * | 11/2013 | Liew | H04L 65/403 705/319 |
| 9,031,951 | B1 * | 5/2015 | Baluja | G06F 17/30861 707/737 |
| 9,418,174 | B1 * | 8/2016 | Gan | G06F 17/30707 |
| 9,792,351 | B2 * | 10/2017 | Hernandez-Sherrington | G06F 17/30604 |
| 2002/0147710 | A1 * | 10/2002 | Hu | G06Q 30/02 |
| 2003/0101286 | A1 * | 5/2003 | Kolluri | G06F 17/30882 719/316 |
| 2009/0077124 | A1 * | 3/2009 | Spivack | G06Q 30/02 |
| 2009/0171873 | A1 * | 7/2009 | Dolin | G06Q 40/02 706/20 |
| 2010/0004975 | A1 * | 1/2010 | White | G06Q 30/0201 706/46 |
| 2010/0161662 | A1 * | 6/2010 | Jonas et al. | 707/780 |
| 2010/0281068 | A1 * | 11/2010 | Brown et al. | 707/803 |
| 2011/0282855 | A1 * | 11/2011 | Ronen et al. | 707/706 |
| 2012/0122588 | A1 * | 5/2012 | Berger | A63F 13/10 463/42 |

(Continued)

*Primary Examiner* — Ashish Thomas
*Assistant Examiner* — Jedidiah P Ferrer
(74) *Attorney, Agent, or Firm* — Prasad IP, PC (57) ABSTRACT

Methods, systems and articles of manufacture for discovering relationships among data elements within a dataset are disclosed. A first relationship is identified between a first data element and a second data element by identifying a correlation between a first attribute of the first data element and the first attribute of a second data element. A second relationship indicator is generated that is indicative of a relationship between the first data element and the second data element based on the correlation between the first attribute of the first and second data elements. Various embodiments can identify implicit relationships across one or more levels of explicit relationships where the explicit relationships can be across different attributes. Such techniques can be employed in various types of application programs.

1 Claim, 7 Drawing Sheets

(56) References Cited

U.S. PATENT DOCUMENTS

| | | | | |
|---|---|---|---|---|
| 2013/0155068 A1* | 6/2013 | Bier et al. | | 345/440 |
| 2013/0332671 A1* | 12/2013 | Whelan | | 711/108 |
| 2014/0006437 A1* | 1/2014 | Gay | G06F 17/301 | 707/758 |
| 2014/0172914 A1* | 6/2014 | Elnikety | G06F 17/30958 | 707/774 |

* cited by examiner

| Element 1 | Element 2 | Element Path | Strength Path | Cumulative Strength | Distance | Factored Strength |
|---|---|---|---|---|---|---|
| Joe | Tylenol | .Joe.Tylenol | .5 (twice a week) | | .5 | |
| Joe | Zyrtec | .Joe.Zyrtec | .2 | | .5 | |
| Joe | Aspirin | .Joe.Aspirin | .25 | | .5 | |
| Joe | Steve | .Joe.Tylenol.Steve | .4 | | 1 | |
| Joe | Susan | .Joe.Tylenol.Susan | .5 * .2 | .1 | 1 | .1 |
| Joe | Sam | .Joe.Tylenol.Sam | .5 * .1 | .05 | 1 | .05 |
| Joe | Susan | .Joe.Aspirin.Susan | .25 * .5 | .125 | 1 | .125 |
| Joe | Bob | .Joe.Aspirin.Bob | .25 * .3 | .075 | 1 | .75 |

Figure 4

COMPUTERIZED SYSTEM AND METHOD FOR IDENTIFYING RELATIONSHIPS

AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This invention relates generally to the field of data processing and in particular to methods and systems for data searching and analysis.

Data is increasingly available in computerized form. Recently, this trend has increased with the emergence of smart phones, social networks, and computer controlled machines that capture varied types of data. For example, smart phones enable the capture of multiple types of data such as the location of an individual via the GPS capability contained in many smartphones. Social networks such as Facebook and LinkedIn enable the capture of relationships between people. Computer controlled machines such as home appliances or industrial machines enable the capture of various types of data pertaining to the machine's usage. For example, a computer-controlled thermostat can capture temperature variations in a home or office building and with communications capability such as via a wireless network, and such information can be transmitted to a computerized database. In addition to the foregoing, the development of various types of inexpensive sensors that are capable of capturing varied types of physical phenomena adds to the availability of data available in computerized form. For example, motion sensors can detect movement in a particular location, temperature sensors can detect highly localized temperature, pressure sensors can detect localized air pressure, optical sensors can detect the intensity of light, accelerometers can detect acceleration of specific devices or parts of the body, etc.

The availability of increasingly large and diverse computerized data has led to the development of various techniques for analyzing the data to gain useful knowledge. Yet, despite the varied work in data analysis there remains a need for improvements in the methods and systems employed to understand relationships between various data elements.

SUMMARY

Embodiments of the present invention provide methods, systems and articles of manufacture for discovering relationships among data elements within a dataset. A first relationship is identified between a first data element and a second data element by identifying a correlation between a first attribute of the first data element and the first attribute of a second data element. A relationship indicator is generated that is indicative of a relationship between the first data element and the second data element based on the correlation between the first attribute of the first and second data elements.

Embodiments of the present invention provide a number of benefits. First, relationships that are not explicitly set forth among the data elements analyzed are identified. Also, the implicit relationships identified are identified by explicit relationships between second attributes where the second attributes are of a different type or class than the first attributes. Such embodiments are not limited to utilizing only explicitly declared relationships. Instead, such embodiments advantageously employ explicitly declared relationships to identify other relationships that are only implicitly identified. This feature is increasingly important as the size of datasets increases and the number of implicit relationships increases but is increasingly difficult to identify via manual or other known automated techniques.

Additionally, in datasets with multiple data elements, each with multiple attributes, embodiments of the present invention can identify implicit relationships across more than one level of explicit relationship by linking together multiple explicit relationships. In this manner, embodiments of the present invention can identify implicit relationships having varying distances, the distance being a function of the number of explicit relationships that define the implicit relationship.

Furthermore, in certain embodiments, the strength of a relationship can be identified, where the strength is indicative of a relationship between attributes of data items where the attributes are of different types, i.e., indicative of a different characteristic of their respective associated data items.

Various embodiments as described above advantageously implement a relationship identification engine and/or method that identifies implicit relationships among data items within a dataset. Such engines and/or methods can advantageously be employed by various application programs operating on various datasets to identify relationships within a variety of contexts. For example, social networking application programs, or collections of programs, can employ embodiments as described above and further herein to identify relationships among individuals within social networking environments. Additionally, medical diagnostic type applications may employ datasets containing a large variety of attributes for data items representing individuals to identify implicit relationships between attributes as varied as individual personal medical history, physical diagnosis, places visited and/or lived, medicines taken, etc. Additional applications that can benefit from the relationship identification capabilities disclosed herein include applications developed in support of criminal or security investigation where there is a strong need to identify relationships that may be implicit among datasets including large numbers of attributes. For example, such datasets may include information as varied as phone calls placed, places lived and/or visited, family and friend relationships, flights or other public transportation taken, emails or other electronic messages sent/received. In addition to the specific applications disclosed herein, others will be apparent to those skilled in the art in view of this disclosure As the size of datasets increases, it is increasingly impractical to manually perform successive queries, in a trial and error fashion, in order to identify implicit relationships in a dataset. Merely searching and getting results is time consuming and prone to error. In contrast, embodiments of the present invention provide methods and apparatus that systematically identify implicit relationships within a dataset. In addition, embodiments disclosed herein provide an indication of the strength of the identified relationships, thereby providing a quantitative indication of the identified relationships.

DETAILED DESCRIPTION

A detailed description of embodiments of the present invention is provided below in conjunction with the drawings. It should be noted that these specific embodiments are merely illustrative and are not intended to in any way restrict the scope of the invention, which is defined by the appended claims. In the following description, reference is made, purely to simplify understanding, of usage of several well-known medicines, by their brand names, which may be trademarked. Usage of these names is purely for simplification of understanding the principles of the invention and the reference to the medicines does not represent any actual or recommended dosages.

Figure 1:
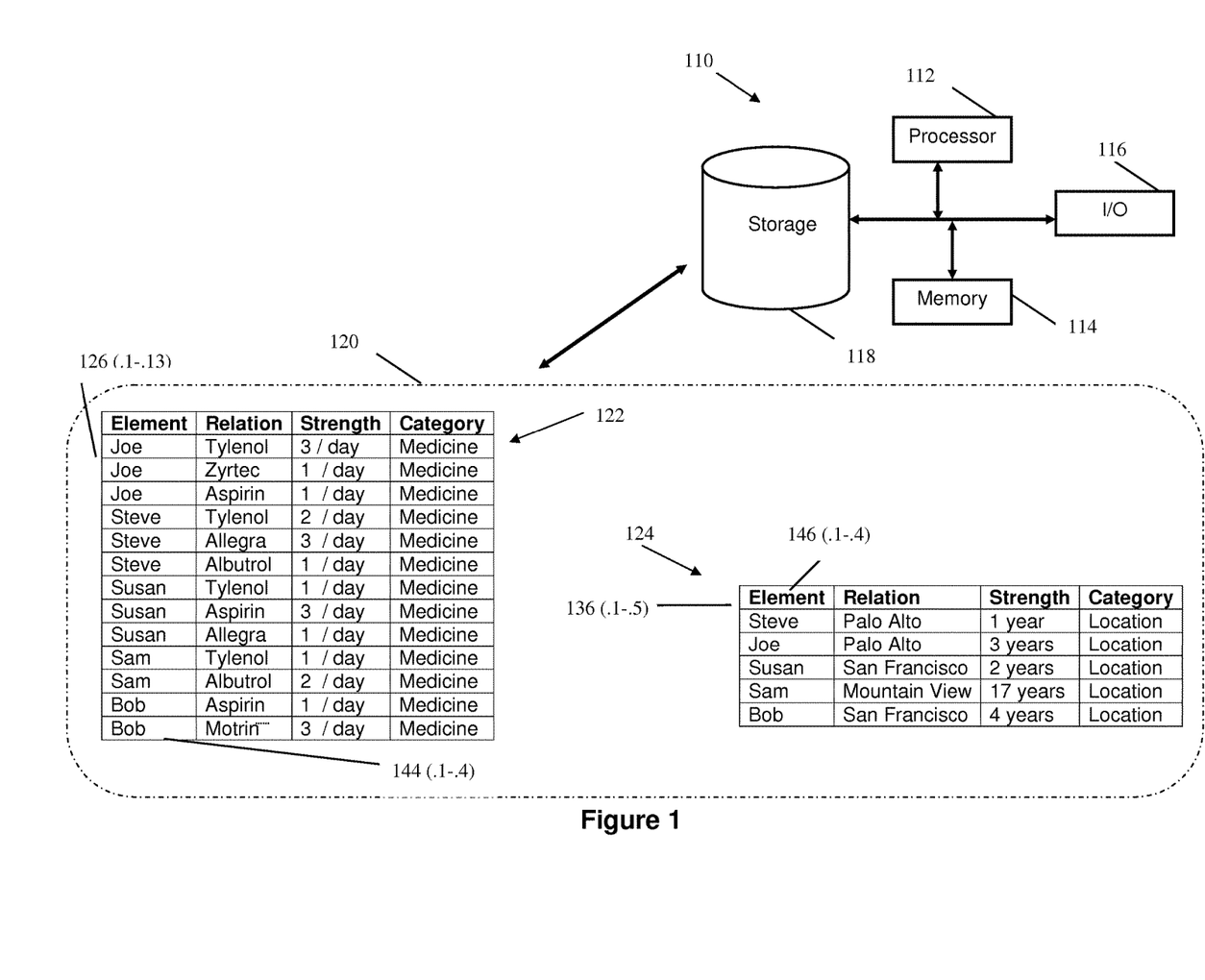
FIG. 1 is an overview of a system with data tables containing data that may be analyzed in accordance with certain preferred embodiments.
Figure 2A:
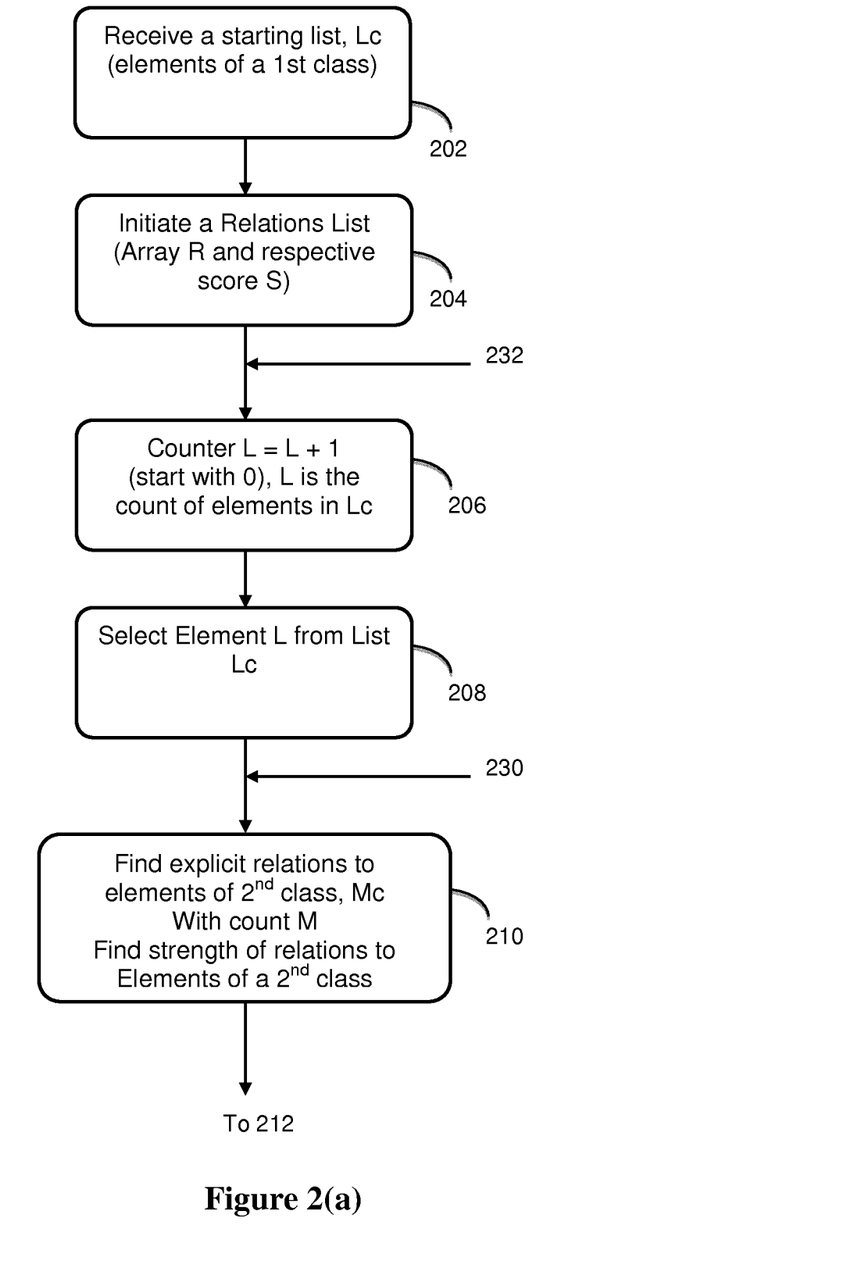
FIGS. 2(a), 2(b), 2(c) and 2(d) show flowcharts containing steps performed in certain embodiments to analyze data of the type shown in FIG. 1.
Figure 2B:
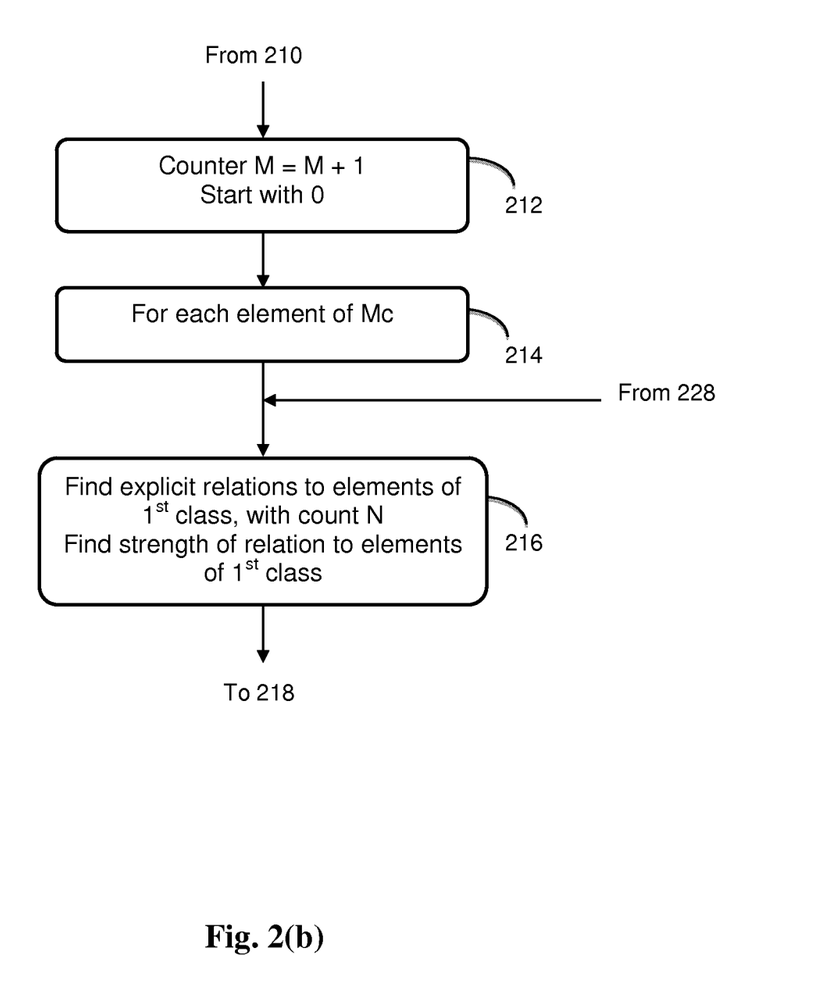
Figure 2C:
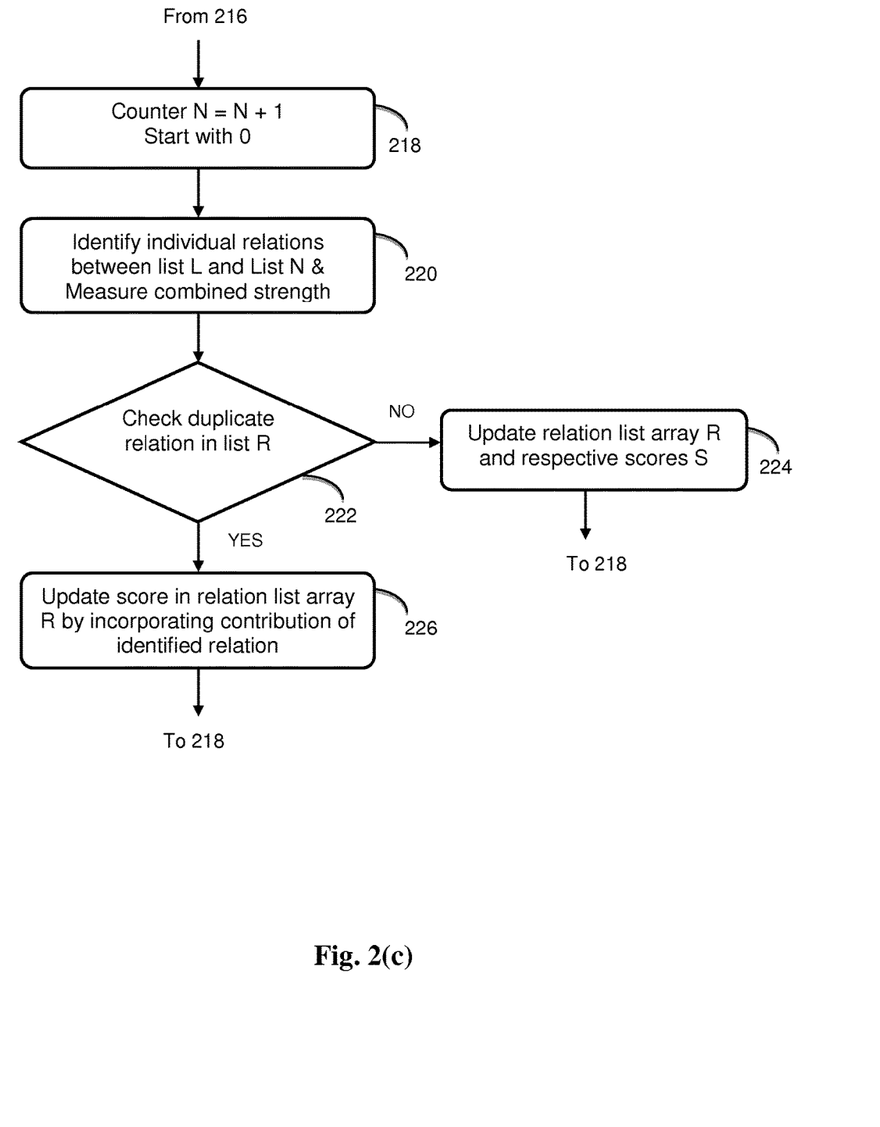
Figure 2D:
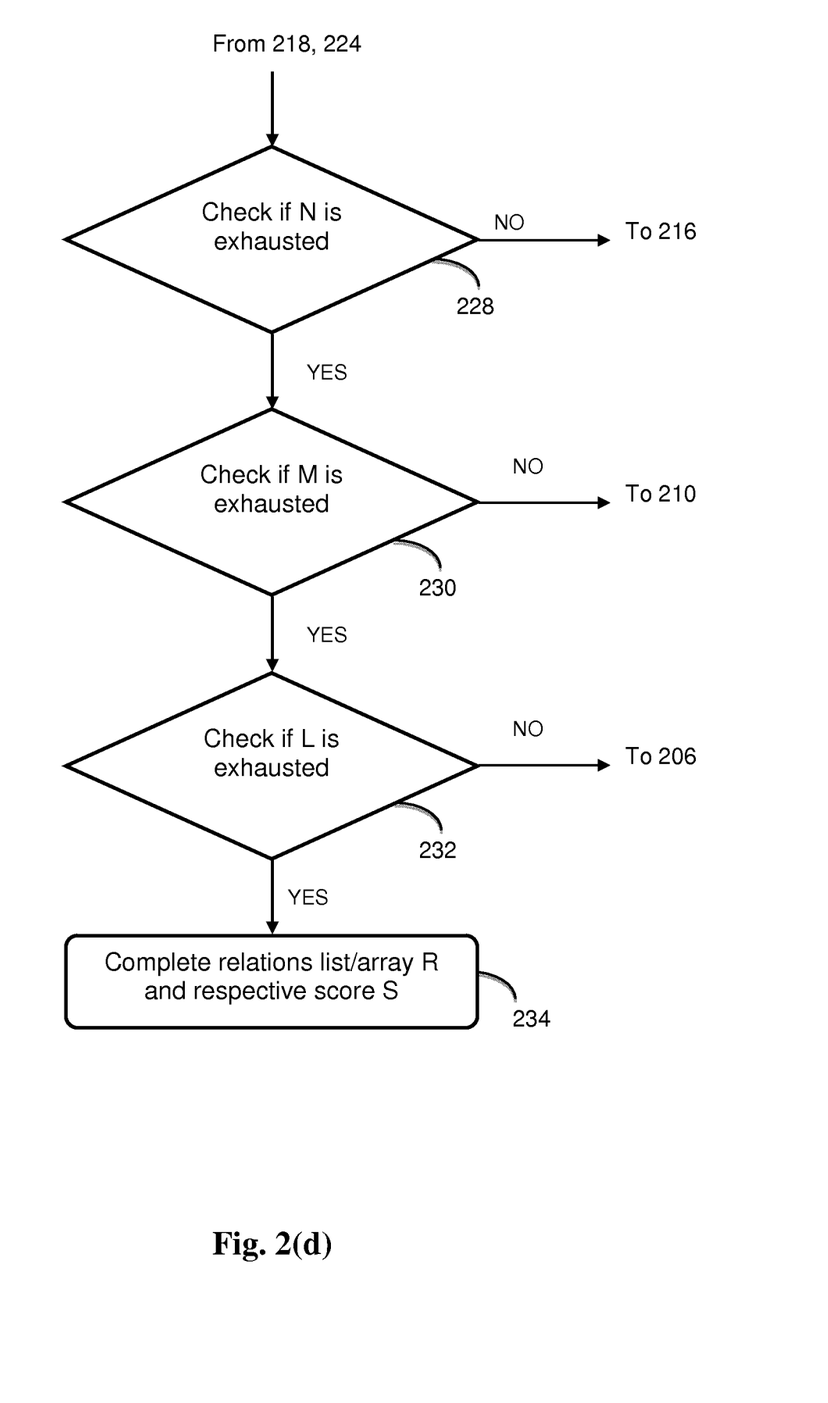

FIG. 1 is an overview of a system with data tables containing data that may be analyzed in accordance with certain preferred embodiments. In FIG. 1, computer system 110 takes the form of a conventional system capable of executing stored programs. Computer system is shown in FIG. 1 as including a processor 112, memory 114, input/output (I/O) 116 and non-volatile storage 118. In accordance with a preferred embodiment, computer system 110 manages a database of information including the information 120 shown in tables 122 and 124. Tables 122 and 124 in a preferred embodiment are generated and managed by conventional relational database management software. The format and mechanism by which tables 122 and 124 are created and managed are not critical and such data may be organized in a variety of formats including organizations that permit usage within object oriented systems or other data management systems.

Tables 122 and 124 each comprise a plurality of data items, shown as rows 126 and 136, collectively for each table, with each individual row being designated as .1, .2, . . . . Each data item is comprised of a plurality of columns or attributes 144 (for table 122) and 146 (for table 124) with each attribute being individually designated as .1, .2, . . . . Table 122 is comprised of attributes Element, Relation, Strength and Category. Table 122 contains data for a number of individuals (elements) and their relationship with various medicines taken (Relation) and the strength of the relationship with those medicines (Strength). As seen, Strength is shown represented by the frequency with which the medicines are taken. The Relation and Strength attributes in table 122 are all within a single Category: Medicine.

Table 124 is comprised of attributes: Element, Relation, Strength, and Category. Specifically, for each individual represented in data items 136 (.1-.5) table 124 contains data in the Relation attribute for their location and in the Strength attribute for the length of time they have resided at the respective location. The attributes Relation and Strength are indicative of a different characteristic of the individual (Element) represented.

The data shown in tables 122 and 124 is organized in two categories: medicine and location. For simplicity of explanation, only these two categories are illustrated. Embodiments of the present invention are not limited to two categories and indeed may employ multiple categories. For example, data tables 122 and 124 may be supplemented with data in other categories such as: prior residences, current and/or past symptoms, current and/or past diagnosed ailments, past medicines taken, etc.

Tables 122 and 124 are organized in a normalized format. As will be appreciated by those skilled in the art, normalizing the data structure consists of defining and grouping the data along independent objects with clearly defined relationships between these objects. The objective is to simplify the additions, deletions, and modifications of these objects. In other words, performing these operations can be made in just one table and then propagated through the rest of the database via the defined relationships.

Each table comprises a plurality of data items (126.1-13 for table 122, and 136.1-.5 for table 124) with each data item comprising a plurality of columns or attributes (144.1-.4 for table 122, and 146.1-.4 for table 124). Those skilled in the art will appreciate in view of this disclosure that the data may be stored in different formats, but appropriate modifications may need to be made to the steps in FIGS. 2(a-d) to process the data. The attribute designated as Element operates to uniquely identify each data item. The remaining attributes contain additional data for the data item identified by the attribute. Each of the attributes can be considered to be part of a different class. For example, the attribute Element is shown to be of the class Name, the attribute Relation is shown to be of the class Medicine, the attribute Strength is shown to be of the class Daily Dosage and the attribute Category is shown to be of the class category. The data shown in tables 122 and 124 is shown in simplified form purely for illustrative purposes with designations, such as a first name for the Element attribute, commonly known trade name for the Relation attribute and daily dosage for the Strength attribute. Those skilled in the art will appreciate that the actual data in a method or system incorporating the principles described herein will likely contain data of much greater complexity and specificity than shown illustratively herein. For example, the Element attribute may be a numeric identifier instead of a first name, the Relation attribute may be a specific chemical designation, or numeric identifier, for a medicine, and the Strength attribute may designate a precise dosage of a particular chemical. Further, for table 124, the Relation attribute may be a far more specific designation than a town name, and the Strength attribute may be more specific than a whole year designation.

Figure 3:
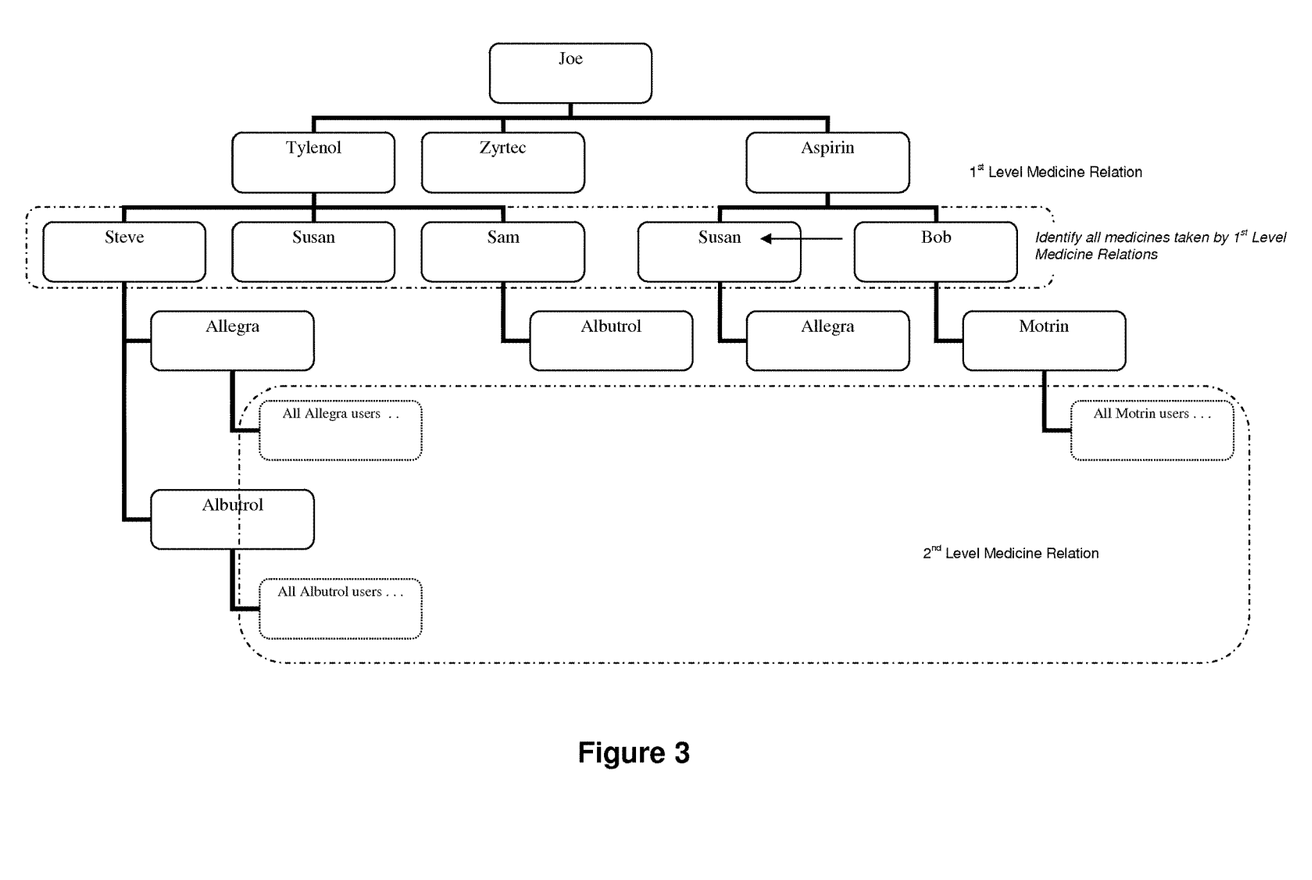
FIG. 3 shows a relationship diagram that results from operation of the steps shown in FIGS. 2(a-d) to the data tables in FIG. 1.

FIGS. 2(a-d) are flowcharts showing steps that are performed by preferred embodiments to analyze the data shown in FIG. 1 in order to identify relationships among data items 126 and/or 136. The steps shown in FIGS. 2(a-d) advantageously operate to identify relationships implicitly contained among data items 126 and/or 136. In the following description, reference is also made to FIG. 3 in conjunction with the flowcharts of FIGS. 2(a-d) and the data tables shown in FIG. 1. FIG. 3 shows a relationship diagram that results from operation of the steps shown in FIGS. 2(a-d) to the data table 122 in FIG. 1. It will be apparent to those skilled in the art that the relationship diagram in FIG. 3 merely shows relationships identified by the flowcharts of FIGS. 2(a-d). Such relationships may be stored for example in data tables that enable storage of data indicative of such relationships.

Preferred embodiments employ a plurality of loops to identify the implicit relationships contained in the data represented in FIG. 3. FIG. 3 shows an example of individuals (of the class person) and the medicines (of the class medicine) that they take. At step 202 a starting list of elements of a first class (in this case individuals) $L_c$ is received. For simplicity of illustration, the starting list $L_c$ is shown in FIG. 3 to consist of a single individual, Joe. The starting list could include a much larger list of individuals, in which case the steps shown in FIGS. 2(a-d) would be repeated as shown at 232. A loop is executed to identify for the selected element (Joe) of the first class (individuals), the explicit relationships to the elements of the second class (medicines).

The starting list of data items identified at step 202 is in table 122 and corresponds to the data items 126. At steps 204 and 206 a relations list consisting of an array R, and a score variable S is initiated, and a counter L, to sequence through $L_c$ is initiated. The counter is set at step 206 to an initial value to cause at step 208 the first identified data item, in this case, data item 126.1 (Joe) to be selected.

As seen in FIG. 3, counter M will sequence through the list consisting of medicines Tylenol, Zyrtec and Aspirin. For each medicine, at step 210, an explicit relationship between a medicine (element of $2^{nd}$ class $M_c$) and an individual (Joe) is identified. For Joe, at step 210 the relationships between Joe and the medicines that he takes (Tylenol, Zyrtec, Aspirin) will be identified. The strength of each relation is also identified (not shown in FIG. 3). Table 1 below shows the explicit relations, and associated strengths identified at step 210:

TABLE 1

| Explicit Relation | Strength (in pills per day) |
|---|---|
| Joe-Tylenol | .42857 (3 Tylenols per week) |
| Joe-Zyrtec | 1 (1 Zyrtec per day) |
| Joe-Aspirin | .5 (1 Aspirin every other day) |

In this example, the strength of the relationship between Joe and the medicines that he consumes is indicative of the dosage.

At steps 212-216, Counter M is initiated at step 212 and employed to sequence through the identified elements of the second class $M_c$. In the example shown in FIG. 3, for each element of the second class $M_c$, in this case elements, Tylenol, Zyrtec and Aspirin, relationships are identified to elements of the first class, in other words, other individuals who consume those medicines. The strength of the relationship between medicines and individuals is also identified. The metrics used to determine the strength of a relation can vary widely. For example the metrics can be measured by the average daily dose in mg. or the number of pills taken every month. For example, Table 1 uses the number of pills per day.

While the relations identified at step 216 are explicitly set forth in the data contained in table 122, at steps 218-226 relations that are implicit in the data in table 122 are identified. Counter N is employed to sequence through the list of individuals identified in step 216, which in this case are Steve, Susan, Sam, Susan and Bob. At step 220, the implicit relationships between the selected individual in list L (Joe) and the individuals in list N is identified. In this case, as can be seen in FIG. 3, Joe is related implicitly to Steve, Susan, Sam, Susan and Bob. Also at step 220 the combined strength of the implicit relationship is identified. As seen, Joe is related to Steve, Sam and Bob by virtue of a single medicine in common, whereas Joe is related to Susan by virtue of two common medicines. The relationship between Joe and Susan is therefore stronger than Joe's relation with Steve, Sam and Bob.

Steps 222-226 handle duplicate identified relationships, such as between Joe and Susan. At step 222 if no duplicate is identified, relationship indicator R and score S are updated at step 224. If at step 222 a duplicate is identified, such as Susan being related by Aspirin in addition to being previously being identified as being related by Tylenol, then at step 226, the relationship indicator R and score S are updated to indicate the stronger relationship.

Steps 228-232 are tests to determine whether the corresponding loop has completed. Finally, at step 234 the relation list R and associated scores are finalized and the routine is completed.

Tables 122 and 124 provide a simplified example of the relations that can be identified by embodiments of the present invention. For example, Steve, shown in table 122 takes Tylenol 3 times per day and Aspirin 1 time per day. Joe takes Tylenol 3× per day and Benadryl twice per day. Steve and Joe can be said to have a relationship by virtue of taking the same medicine (Tylenol). Similarly, Susan, represented by data item 134 takes Benadryl once per day. Joe and Susan can be said to have a relationship by virtue of taking the same medicine (Benadryl). Turning to table 124, a similar analysis can be performed to identify a relationship between Steve (data item 136) and Joe (data item 138) as living in the same town.

When the analysis of both tables 122 and 124 is taken collectively, it can be seen that Steve and Joe are related in two dimensions: medicine taken (Tylenol) and residence (Palo Alto). Joe and Susan are related in a single dimension: medicine taken (Tylenol, Aspirin), but that single relationship is relatively strong because they have two medicines in common.

The embodiment shown in conjunction with FIGS. 2(a-d) performs an exact match to identify relationships. For example, Joe and Steve both take Tylenol and are both therefore implicitly related. It will be appreciated by those skilled in the art in view of the present disclosure that an exact match is not required to identify a relationship. For example, alternative embodiments may employ an identified range by which a match may be accomplished. Such a range may be defined by a user or an administrator or may be algorithmically generated.

In the foregoing description, the relationships identified are shown by identifying a match between an attribute of a first element and a second element. For example, in FIG. 3, Joe is identified as being related to Steve because both take the same medicine, Tylenol. It is not necessary for the relationships to be determined by an exact match. In alternative embodiments, the relationships may be identified by identifying a correlation between attributes for different data elements. In such embodiments, the correlation required to identify a relationship may be set statically, or alternatively, may be dynamically generated by any one of a variety of known techniques. For example, one type of exact match can be an association to a type of blood. On the other hand an example of correlation that is not an exact match is people who were within a certain range of proximity to a disaster area such as the nuclear reactor of Chernobyl. In this case the definition of proximity offers some latitude in its definition and instead of using an exact match a level of correlation, which in this case can be distance, can be used.

In general there are a variety of techniques that can be used to define and identify relations whether exact or correlated. Typically the most basic solution is to tap on explicit exact matches with data stored in a database, an example of such data may be the friendship relations in a social network. On the other hand there are known techniques to characterize the more fuzzy correlations. Some take their roots in the statistical field and are by and large inspired by work in Bayesian analysis. Another technique is to utilize rule based systems to algorithmically create means to measure the relation. A third would be in the analysis of streaming data with tools that spot patterns or capture streams that fall within certain parameters.

Figure 4:
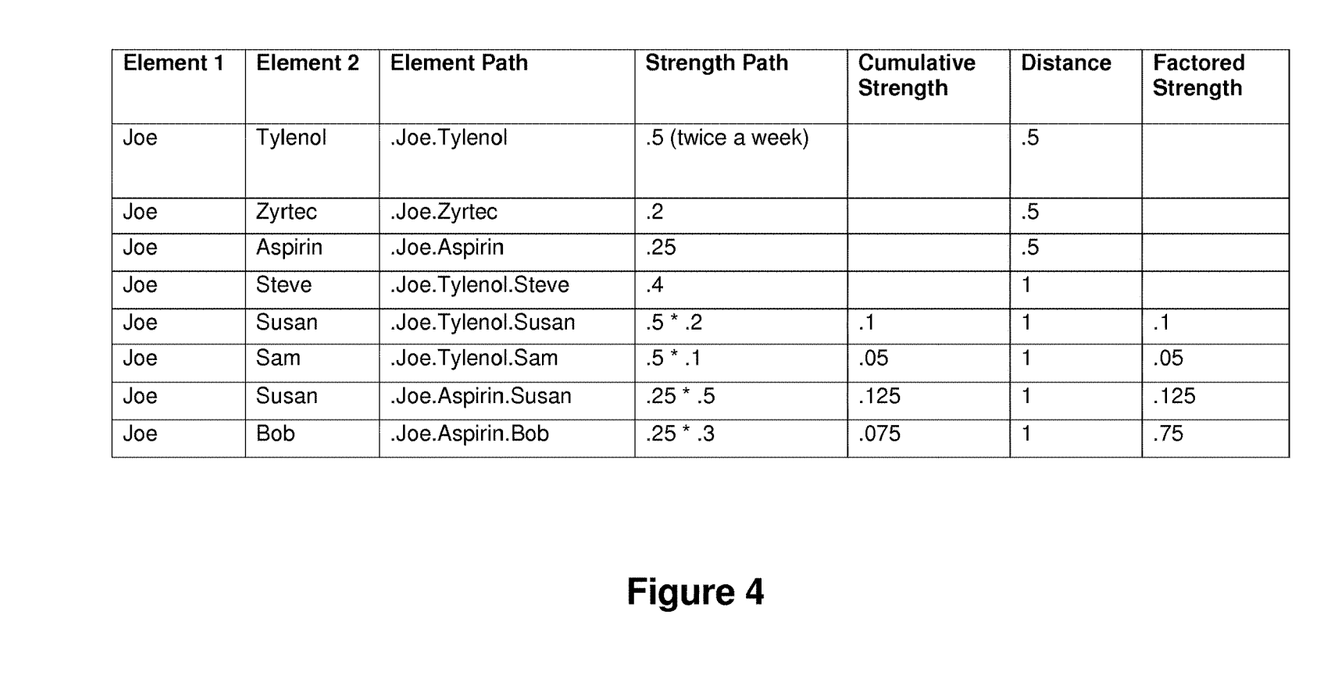
FIG. 4 shows a data table showing strength calculations for relationships identified in preferred embodiments.

FIG. 4 shows a results table generated from the steps shown in FIGS. 2(*a-d*). In a first step we identify the explicit relations between 2 elements (typically of different nature), in this case people and medicine. The table shown in FIG. 4, contains the relation identified between Joe and Tylenol, Joe and Zyrtec, and Joe and Aspirin. Each of these relations has a declared known strength. It is rare, but occasionally there may be a situation where all relations have the same strength. The table also contains for each row the other relations. So for Tylenol the table shows that Steve, Susan and Sam use Tylenol. Each one of these new identified relations is characterized by a strength. Identification of usage of a common medicine permits identification of a relationship of Steve, Susan and Sam to Joe, or in other words, three first level relations. In addition, it can be seen that there are no other users of Zyrtec and thus no relation is created. And there are two relations created through Aspirin—Susan and Bob. We also notice that Susan is related to Joe through two distinct paths. As a result she will benefit of a cumulative score when measuring the final relation score.

The table of FIG. 4 also contains an adjustment of the relationship strength (score) for distance. The further away the relation is discovered the less impactful it is. For example, a first level relationship such as between Joe and Steve, Susan, Sam is stronger than a relationship where Joe may be related to someone else because that person takes a medicine that Joe does not take but that one of Joe's first level relations takes. Hence, there is a need to adjust the total score of each relation for distance. This process can be repeated over and over again. For each repetition of the process, the identification progresses one layer deeper in distance from the source. In this example, it has been discovered in the first repetition of the process four relations: Joe-Steve, Joe-Susan, Joe-Sam and Joe-Bob. These relations did not exist in the original explicit relation between people and the medicine they take.

The embodiments described herein provide several advantages over existing techniques to describe relations. For example relational database and SQL allow description of explicit relations that are stored in the database. But they fall short when it comes to discovering relations that are not explicit. Statistical analysis such as Bayesian techniques permit discovery of implicit relations, but only after the relations have been established and have gained popularity. Statistical systems by nature require a large amount of data. Their applicability is limited in fields where data is not readily available. For example in emergency response systems they would not be effective for new threats.

In the example shown above, assume the CDC (Center for Disease Control and Prevention) is trying to analyze the spread of a problem with the health of its population. They could discover through a tool based on the principles described herein, the possible relations based on medicine consumption, places visited in the past 90 days, activities undertaken, office work performed, and weigh the various factor accordingly to discover the source of the disease. The techniques described herein and based on tradeoffs between the various factors/criteria rapidly allow identification of the source of the problem.

The embodiments shown in FIGS. 1, 2(*a-d*), 3 and 4 may be implemented with data stored in a Relational DataBase Management System (RDBMS). The relationship identification shown in the foregoing figures may be implemented by way of software code employing Structured Query Language (SQL). An illustrative embodiment is shown below. Those skilled in the art will appreciate that the code shown below is merely illustrative and that multiple variants of the code may be employed and using different programming languages and further that the relationship identification described herein may be employed upon data organized in databases other RDBMS's.

```
    select cat as category, rootElm1 as Element1, elm1 as Element2,
ElementPath, ltrim(StrengthPath,'*') as StrengthPath,
        CumStrength, Distance, CumStrength / Distance as FactoredStrength
      from
    (
select s.*,
        trunc(dist / 2) as distance,
        MultiplyString(StrengthPath) as CumStrength,
        row_number( ) over (partition by rootid1, id1, cat order by dist asc,
pstrength desc) as IDRowNum,
        row_number( ) over (partition by rootelm1, elm1, cat order by dist asc,
pstrength desc, rootid1, id1) as ElmRowNum
      from
    (
select connect_by_root id1 as rootid1,
        level as dist,
        sys_connect_by_path(id1, '.') as IDPath,
        sys_connect_by_path(elm1,'.') as ElementPath,
        sys_connect_by_path(case when elm1 = nvl(prior elm1, elm1) then 1
else strength end,'*') as StrengthPath,
        connect_by_root elm1 as rootelm1,
        id1, id2, elm1, prior elm1 as pelm1,
        strength, prior strength as pstrength, cat
      from
        (select a.id as id1, b.id as id2, a.element as elm1, b.element as elm2,
a.category as cat,
            case when a.element = b.element then 1 else a.strength *
b.strength end as strength
            from pear a
            inner join
                pear b
            on a.id <> b.id
            and ( a.element = b.element and a.category = b.category)
                or (a.relation = b.relation
                )
        )
connect by nocycle
            id2 = prior id1
        ) s
    )
where IDRowNum = 1 and ElmRowNum = 1
    and rootElm1 <> Elm1
    and rootElm1 = :P6_STARTING_POINT
Copyright 2012, Fadi Micaelian.
```

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer system for identifying relationships among computerized data comprising:

data storage containing the computerized data which comprises an element table organized in a relational format comprising a plurality of elements, each element being within a first class and comprising an attribute indicative of a relation to an element in a second class, different from the first class, and a strength value indicative of strength of the relation; and a processor operatively coupled to the storage, the processor configured to execute structured query language (SQL) commands that when executed cause the processor to:

select from the element table, each tuple comprising two elements of the first class in the element table;

perform a first SQL query in the form of a first inner join on the element table to generate a listing of explicit relationships comprising an explicit relationship between each element in the element table with each other element in the element table, generate a listing of first relationship strength values, one for each explicit relationship, indicative of the strength of the corresponding explicit relationship;

perform a second SQL query on the listing of explicit relationships and the listing of first relationship strength values to identify implicit relationships by retrieving all combinations of explicit relationships in the listing of explicit relationships, wherein a subset of the combinations of explicit relationships are characterized by multiple levels of explicit relationships, and wherein each implicit relationship comprises an original element and a second element to which the original element is implicitly related, wherein the second SQL query generates, a path strength value indicative of the strength of each explicit relationship within each implicit relationship;

an array comprising for each implicit relationship,
the original element, and
a path between the original element and the second element comprising one or more legs, wherein each leg of the path is characterized by a path strength value, perform a third SQL query on results of the second SQL query to calculate a cumulative strength value indicative of cumulative strength of each implicit relationship as a function of the number of legs between the original element and the second element of each implicit relationship and the path strength value of each leg; and perform a fourth SQL query on results of the third SQL query
to remove any element identified as being implicitly related to itself, and
to combine implicit relationships where the original element and the second element are the same, and to combine the cumulative strength value of each of the implicit relationships that are combined,
wherein the result of the fourth SQL query comprises a set of implicit relationship tuples, wherein each implicit relationship tuple comprises a unique combination of an original element and a second element, the cumulative strength value, and the cumulative strength value as adjusted by the number of paths between the original element and the second element.

* * * * *